United States Patent [19]
Bertram et al.

[11] Patent Number: 4,800,215
[45] Date of Patent: Jan. 24, 1989

[54] COMPOSITIONS PREPARED FROM DIALKANOLAMINES AND TRIGLYCIDYL ETHERS OF TRISPHENOLS

[75] Inventors: James L. Bertram, Lake Jackson; Willie L. Myles, Brazoria, both of Tex.; Michael P. Kubisiak, Hayward, Calif.

[73] Assignee: The Dow Chemical Company, Midland, Mich.

[21] Appl. No.: 170,217

[22] Filed: Mar. 18, 1988

Related U.S. Application Data

[63] Continuation-in-part of Ser. No. 918,421, Oct. 14, 1986, abandoned, which is a continuation-in-part of Ser. No. 515,757, Jul. 21, 1983, abandoned.

[51] Int. Cl.$^4$ .............. C08L 63/00; C08G 63/76; C08G 8/28; C08G 65/08

[52] U.S. Cl. .................. 523/414; 525/411; 525/481; 525/486; 525/511; 525/514; 525/528; 528/73; 528/96; 528/98; 528/111; 549/551

[58] Field of Search ............... 523/414; 525/411, 481, 525/486, 511, 514, 528; 528/73, 96, 98, 111; 549/551

[56] References Cited

U.S. PATENT DOCUMENTS

| | | | |
|---|---|---|---|
| 3,336,991 | 2/1968 | Hicks | 525/511 |
| 3,449,281 | 6/1969 | Sullivan et al. | 428/391 |
| 3,789,053 | 1/1974 | Clarke | 528/96 |
| 4,394,496 | 7/1983 | Schrader | 528/98 |

*Primary Examiner*—Kriellion Morgan

[57] ABSTRACT

Uncured compositions are prepared from dialkanolamines and polyglycidyl ethers of tris(hydroxyphenyl)alkanes. These compositions are water soluble or water miscible.

20 Claims, No Drawings

COMPOSITIONS PREPARED FROM DIALKANOLAMINES AND TRIGLYCIDYL ETHERS OF TRISPHENOLS

CROSS REFERENCE TO RELATED APPLICATIONS

This application is a continuation-in-part of application Ser. No. 918,421 filed Oct. 14, 1986 which is a continuation-in-part of application Ser. No. 515,757 filed July 21, 1983, both now abandoned.

BACKGROUND OF THE INVENTION

The present invention pertains to adducts of trisepoxide resins and alkanolamines, curable and cured compositions thereof.

Coating compositions having good mechanical and chemical properties are well known in the art, but usually require modification to render them water soluble or water miscible. In most instances, this modification results in decreased properties of the cured coating compositions or raises the application viscosities at desired solids levels. The present invention provides a water soluble resin suitable for use in water borne coating systems employing amine-aldehyde, urea-aldehyde or phenol-aldehyde curing systems wherein the resultant coatings have excellent thermal stability and/or elongation. In those instances where modification of the adduct is required to achieve the desired degree of water solubility or miscibility, less modification is required with the adducts of the present invention than with those of the prior art to achieve comparable levels of water solubility or miscibility.

SUMMARY OF THE INVENTION

One aspect of the present invention pertains to uncured, water soluble or water miscible adducts prepared by reacting (1) at least one polyglycidyl ether of a tris(hydroxyphenyl)alkane and (2) at least one dialkanolamine in quantities which provides a ratio of moles of dialkanolamine to epoxy equivalents of from about 0.9:1 to about 1.1:1, preferably from about 1:1 to about 1.05:1.

Another aspect of the present invention concerns curable compositions comprising (A) an uncured, water soluble or water miscible adduct of (1) at least one polyglycidyl ether of a tris(hydroxyphenyl)alkane and (2) at least one dialkanolamine in quantities which provides a ratio of moles of dialkanolamine to epoxy equivalents of from about 0.9:1 to about 1.1:1, preferably from about 1:1 to about 1.05:1; and (B) a curing quantity of a suitable curing agent for component (A) selected from amine-aldehyde resins, melamine-aldehyde resins, urea-aldehyde resins, phenol-aldehyde resins or mixture thereof; and (C) a catalytic quantity of a suitable catalyst for the reaction between components (A) and (B).

Still another aspect of the present invention pertains to a coating composition comprising (A) an uncured, water soluble or water miscible adduct of (1) at least one polyglycidyl ether of a tris(hydroxyphenyl)alkane and (2) at least one dialkanolamine in quantities which provides a ratio of moles of dialkanolamine to epoxy equivalents of from about 0.9:1 to about 1.1:1, preferably from about 1:1 to about 1.05:1; and (B) a curing quantity of a suitable curing agent for component (A) selected from amine-aldehyde resins, melamine-aldehyde resins, urea-aldehyde resins, phenol-aldehyde resins or mixture thereof; and (C) optionally a catalytic quantity of a suitable catalyst for the reaction between components (A) and (B); (D) water; and (E) optionally an organic solvent; wherein component (D) is present in quantities of from about 25 to about 95, preferably from about 35 to about 70 percent by weight of the total composition and component (E) is present in from zero to about 45, preferably from about 3 to about 20 percent by weight of total composition.

DETAILED DESCRIPTION OF THE INVENTION

The term uncured as employed herein means that the "uncured" adduct is not an insoluble, infusible material. This uncured material is; however, capable of being "cured" to an insoluble, infusible material by reaction with curing agents and/or curing catalysts. Materials which are in an uncured state are soluble, fusible and flowable at ambient and elevated temperatures whereas materials which are cured are materials which are infusible, non-flowable at ambient or elevated temperatures and which are non-soluble in water or solvents in which an uncured material from like components is soluble at either ambient or elevated temperatures.

Suitable polyglycidyl ethers of tris(hydroxyphenyl)alkanes which can be employed herein include those represented by the formula

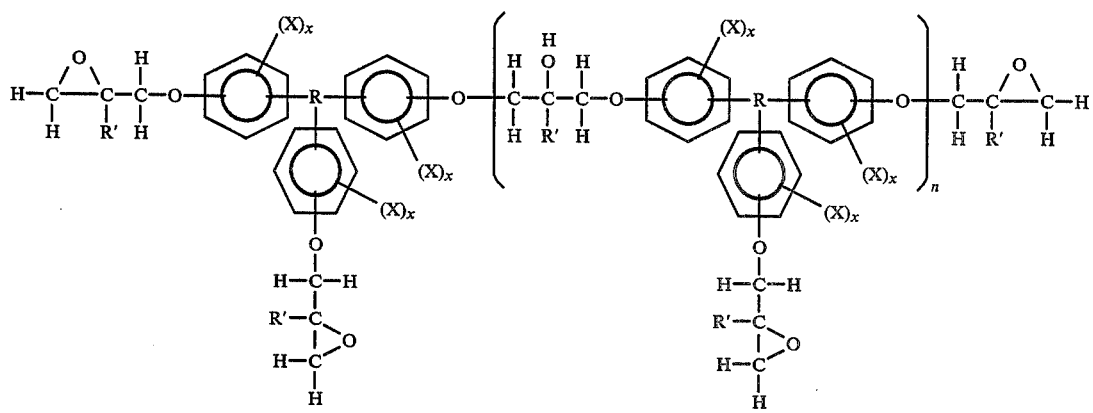

wherein each R is independently a trivalent aliphatic hydrocarbyl group having from 1 to about 5, preferably from about 1 to about 2 carbon atoms; each R' is independently hydrogen or a monovalent hydrocarbyl group having from 1 to about 4 carbon atoms; each X is hydrogen, an alkyl group having from 1 to about 4 carbon atoms, or a halogen atom; n has an average value of from zero to about 10, preferably from about 0 to about 5; and each x independently has a value of 1 or 2.

These polyglycidyl ethers can be prepared by the method described by Raymond W. Mah in U.S. Pat. No. 3,787,451 and Paul G. Schrader in Canadian No. 951,730 (copy submitted with Information Disclosure Statement submitted under 35 CFR 1.97–1.99) and allowed U.S. application Ser. No. 316,586 filed Oct. 30, 1981 which are incorporated herein by reference.

Also suitable are the oxazolidinone modified polyglycidyl ethers of tris(hydroxyphenyl)alkanes which are more fully described by J. A. Clarke in U.S. Pat. No. 3,687,897 and U.S. Pat. No. 3,789,053 which are incorporated herein by reference.

Suitable dialkanolamines include those represented by the formula HO—R″—NH—R″—OH wherein each R″ is independently a divalent hydrocarbyl group having from 1 to about 7, preferably from about 2 to about 4 carbon atoms. Particularly suitable dialkanolamine include diethanolamine, bis(3-propanol)amine, bis(2-propanol)amine, bis(4-butanol)amine, bis(3-butanol)amine, bis(2-butanol)amine, mixtures thereof and the like.

In those instances where the epoxy resin-dialkanolamine reaction products are not completely water miscible or water soluble and when a higher degree of water miscibility or solubility is desired, the resultant reaction product can be reacted with an acid such as, for example, acetic acid, lactic acid, propionic acid, benzoic acid, phosphoric acid mixtures thereof and the like to render the product more soluble or miscible in water.

Suitable curing agents which can be employed herein include, for example, amine-aldehyde resins, alkylated amine-aldehyde resins, melamine-aldehyde resins, alkylated melamine-aldehyde resins, urea-aldehyde resins, alkylated urea-aldehyde resins, phenol-aldehyde resins, alkylated phenol-aldehyde resins, mixtures thereof and the like.

Suitable catalysts for effecting the reaction between the adduct of the polyglycidyl ethers of tris(hydoxyphenyl)alkanes with dialkanolamines and suitable curing agents include, for example, phosphoric acid, organic sulfonic acids such as p-toluene sulfonic acid as well as aryl and alkyl esters thereof. These curing agents and catalysts are more fully described by Lem-Davis, Jr. in U.S. Pat. No. 3,651,169 and by Lee and Neville in *HANDBOOK OF EPOXY RESINS*, McGraw-Hill Book Co., 1965 which are incorporated herein by reference.

Suitable organic solvents which can be employed herein include, for example, any solvent that the resin is soluble in and has at least some solubility in water. For example; glycol ethers of ethylene and propylene oxide, low molecular weight ketones such as acetone, methyl ethyl ketone, methyl isobutyl ketone, etc., alcohols such as methanol, ethanol, propanol, isopropanol, butanol, etc., mixtures thereof and the like.

Although the presence of an organic solvent is not required, when employed in small quantities, e.g. up to about 20 percent by weight of total coating formulation, they improve the flow characteristics of the coating.

The coating compositions of the present invention may also contain, if desired, one or more of such components as fillers, pigments, dyes, fire retardant agents, other additives and the like.

The following examples are illustrative of the present invention, but are not to be construed as to limiting the scope thereof in any manner.

EXAMPLE 1

Diethanolamine, 29.53 grams (0.281 moles) was heated to 135° C. under a nitrogen atmosphere and 50.0 grams (0.267 equiv.) of a 90% solution of an epoxy resin product consisting essentially of the triglycidylether of tris(4-hydroxyphenyl)methane having an epoxide equivalent weight of 168 (polyepoxide A) dissolved in propylene glycol monomethylether (solvent A) was slowly added during approximately 90 minutes (5400 s). The solution was digested at 135° C. for an additional 60 minutes (3600 s). The reaction mixture was then cooled to approximately 90° C., and 69.0 grams of water were added. When cooled to ambient, the product was a homogenous solution with a viscosity of 13,000 cks. at a concentration of 50.2 wt. % resin, 3.3 wt. % solvent A, and 46.5 wt. % water.

EXAMPLE 2

Example 1 was repeated, substituting propylene glycol monobutylether (solvent B) as the organic solvent. The homogenous solution had a viscosity of 320 cks. at ambient temperature and a concentration of 50.2 wt. % resin, 3.3 wt. % solvent B, and 46.5 wt. % water.

EXAMPLE 3

Diethanolamine, 194 grams (1.85 moles) was heated to 135° C. under a nitrogen atmosphere and 405 grams (1.76 equiv.) of an oxazolidinone modified polyepoxide A with an epoxide equivalent weight of 230 dissolved in 45 grams of solvent A was added during approximately 90 minutes (5400 s). The solution was then digested for an additional 60 minutes (3600 s) at 135° C. The reaction mixture was then cooled to less than 100° C., and 549 grams of water were added. The product was a viscous, homogenous liquid. Acetic acid, 11.0 grams (10 equivalent percent based upon the amount of amine present) and additional water were added to give a homogenous solution at 50 wt. % concentration. The viscosity was 146,000 cks. at ambient temperature.

COATING FORMULATIONS

The aqueous resin solutions from Examples 1 and 3 were formulated into curable coating compositions as described in Table I. In general, the curing agent, an amine-aldehyde (Cymel® 303, hexamethoxymethyl melamine-available from American Cyanamide Co.) or a phenol-aldehyde (Varcum® 1035 and 2380A, available from Reichhold Chemicals, Inc.) was mixed into the aqueous resin solution. In some cases, an acid catalyst such as p-toluene sulfonic or phosphoric acid was also added.

TABLE I

| COMPONENTS | COATINGS FORMULATION (Parts by Weight) | | | | | | | | | | |
| --- | --- | --- | --- | --- | --- | --- | --- | --- | --- | --- | --- |
| | A[1] | B | C | D[2] | E | F | G | H[3] | I | J | K |
| RESIN SOLUTION | 25 | 25 | 25 | 25 | 25 | 25 | 25 | 25 | 25 | 25 | 25 |

TABLE I-continued

COATINGS FORMULATION
(Parts by Weight)

| COMPONENTS | A[1] | B | C | D[2] | E | F | G | H[3] | I | J | K |
|---|---|---|---|---|---|---|---|---|---|---|---|
| FROM EXAMPLE #1 OR #3 CROSSLINKER | 1.38 | 2.21 | 3.13 | 3.13 | 4.17 | 5.35 | 6.73 | 3.13 | 4.17 | 5.35 | 6.73 |
| BYK 301[4] | 0.073 | 0.073 | 0.076 | 0.076 | 0.078 | 0.08 | 0.08 | 0.076 | 0.078 | 0.08 | 0.08 |
| $H_3PO_4$ (85% CONC.) | 0.165 | 0.175 | 0.185 | 0[5] | 0[5] | 0[5] | 0[5] | 0[5] | 0[5] | 0[5] | 0[5] |
| SOLVENT A | 1.94 | 1.94 | 1.94 | 1.94 | 1.94 | 1.94 | 1.94 | 1.94 | 1.94 | 1.94 | 1.94 |

[1] Formulations A, B and C crosslinked with Cymel 303 supplied by American Cyanamid Chemical Co.
[2] Formulations D, E, F and G crosslinked with Varcum 1035 supplied by Reichhold Chemicals, Inc.
[3] Formulations H, I, J and K crosslinked with Varcum 2380A supplied by Reichhold Chemicals, Inc.
[4] Flow additive supplied by BYK-Mallinckrodt Chemical Co.
[5] No acid catalyst required.

COATING EVALUATIONS

In general, the coatings were applied to unpolished cold rolled steel or Alodine 1200 treated aluminum Q-panels via a No. 44 wire wound rod to give a coating 0.5-1 mil thick. The coated panels were baked in a controlled-temperature oven at 150° to 225° C.. for 10 to 60 minutes (600 to 3600 s) as described in Tables II, III, IV, V, VI and VII. The cured coatings were tested as follows:

1. Methyl Ethyl Ketone (MEK) Resistance—a two pound ball pein hammer with the ball end covered with eight layers of cheese cloth, was saturated with MEK and rubbed across the baked panels. One back and forth cycle across the panel was considered as being 1 MEK double rub. Two hundred double rubs with no film loss was noted a pass.

2. Boiling Water Resistance—a coated panel was immersed in boiling water for 30 minutes (1800 s). The panel was then removed and cut through with an eleven (11) blade cross hatch knife with 1.5 mm spacing. A strip of scotch tape was applied to the scratch surface and the tape then pulled off. Any loss of adhesion was observed.

3. Glass Transition (Tg)—the resin coating was scraped off the panel after cured, and analyzed for Tg by means of a DuPont Model 1090 differential scanning calorimeter. The coatings showed no Tg deflection up to 250°-260° C. At this point, the onset of an exotherm indicated possible further reaction or decomposition. Any Tg deflection below 250° C. was noted.

4. Elongation obtained according to procedure outlined in ASTM D-522.

THERMAL PROPERTIES OF CURED RESINS

Formulations B, G and K were impregnated onto a glass fiber braid, and cured in an oven at 275° C. for one hour (3600 s). For comparative purposes, polyepoxide A was formulated with an aromatic amine curing agent (diaminodiphenylsulfone) (control) and also impregnated onto a glass fiber braid and cured one hour (3600 s) at 275° C.

The cured samples were then analyzed for their Thermomechanical Properties via a Torsional Braid Analyzer as described by Mark B. Roller, Journal of Coating Technology, Vol. 54, No. 691, page 33 (1982). Also described by J. K. Gillham, "Developments in Polymer Characterization-3", Ch. 5, J. V. Dawkins, Ed., Applied Science Publishers, England (1982).

In Table VIII, Runs 5 and 7 (Formulation K and control), gave sharp Tg's of 325° C. and 325° C. respectively as shown. However, in Runs 1 and 3 (Formulations B and G), the analysis were characterized by multiple transitions, indicating further reaction during the test.

Surprisingly, however, after taking the above samples up to 375° C. at the rate of 1.6° C. per minute during the initial analysis, a rerun of these samples gave apparent Tg's for Runs 2, 4, and 6 (Formultions B, G and K), of about 305° C., 270° C. and 310° C., respectively. Whereas, Run 8 (the control), polyepoxide A showed a thermal instability resulting in a decrease in apparent Tg from about 310° C. to 225° C.

TABLE II

PROPERTIES OF DIALKANOLAMINE ADDUCTS OF TRISEPOXY RESINS[1]

| CYMEL 303 wt. % | FORMULATION | CURE SCHEDULE min./°F. | MEK DOUBLE RUBS | ELONGATION % | BOILING WATER RESISTANCE/ADHESION | Tg (BELOW 250° C.) |
|---|---|---|---|---|---|---|
| 10 | A | 15/350° | Pass | — | No Loss | None |
| " | " | 30/350° | " | — | — | — |
| " | " | 45/350° | " | — | — | — |
| " | " | 60/350° | " | — | No Loss | None |
| 15 | B | 15/350° | " | <2% | No Loss | None |
| " | " | 30/350° | " | 16% | — | — |
| " | " | 45/350° | " | 20% | — | — |
| " | " | 60/350° | " | 26% | No Loss | None |
| " | " | 60/450° | " | 28% | No Loss | None |
| 20 | C | 15/350° | " | — | No Loss | None |
| " | " | 30/350° | " | — | No Loss | None |
| " | " | 45/350° | " | — | — | — |
| " | " | 60/350° | " | — | No Loss | None |
| | Control[2] | 15/350° | " | 4% | No Loss | None |
| | " | 60/350° | " | 14% | No Loss | — |
| | " | 15/450° | " | <2% | — | — |

TABLE II-continued

PROPERTIES OF DIALKANOLAMINE ADDUCTS OF TRISEPOXY RESINS[1]

| CYMEL 303 wt. % | FORMULA-TION | CURE SCHEDULE min./°F. | MEK DOUBLE RUBS | ELONGA-TION % | BOILING WATER RESISTANCE/ADHESION | Tg (BELOW 250° C.) |
|---|---|---|---|---|---|---|
| " | " | 60/450° | " | <2% | — | — |

[1]Resin solution from Example 1.
[2]Polyepoxide A cured with a stoichiometric amount of diaminodiphenylsulfone (DADS).

TABLE III

PROPERTIES OF DIALKANOLAMINE ADDUCTS OF TRISEPOXY RESINS[1]

| VARCUM 1035 wt. % | FORMULATION | CURE SCHEDULE min./°F. | MEK DOUBLE RUBS | BOILING WATER RESISTANCE/ADHESION | Tg (BELOW 250° C.) |
|---|---|---|---|---|---|
| 20 | D | 15/350° | Pass | No Loss | None |
| " | " | 30/350° | " | — | — |
| " | " | 45/350° | " | — | — |
| " | " | 60/350° | " | 40% Loss | None |
| 25 | E | 15/350° | " | No Loss | None |
| " | " | 30/350° | " | — | — |
| " | " | 45/350° | " | — | — |
| " | " | 60/350° | " | 15% Loss | None |
| 30 | F | 15/350° | " | No Loss | None |
| " | " | 30/350° | " | — | — |
| " | " | 45/350° | " | — | — |
| " | " | 60/350° | " | 15% Loss | None |
| 35 | G | 15/350° | " | 10% Loss | None |
| " | " | 30/350° | " | — | — |
| " | " | 45/350° | " | — | — |
| " | " | 60/350° | " | 10% Loss | None |

[1]Resin solution from Example 1.

TABLE IV

PROPERTIES OF DIALKANOLAMINE ADDUCTS OF TRISEPOXY RESINS[1]

| VARCUM 2380A wt. % | FORMULATION | CURE SCHEDULE min./°F. | MEK DOUBLE RUBS | BOILING WATER RESISTANCE/ADHESION | Tg (BELOW 250° C.) |
|---|---|---|---|---|---|
| 20 | H | 15/350° | Pass | No Loss | None |
| " | " | 30/350° | " | — | — |
| " | " | 45/350° | " | — | — |
| " | " | 60/350° | " | 30% Loss | None |
| 25 | I | 15/350° | " | No Loss | None |
| " | " | 30/350° | " | — | — |
| " | " | 45/350° | " | — | — |
| " | " | 60/350° | " | 40% Loss | None |
| 30 | J | 15/350° | " | 10% Loss | None |
| " | " | 30/350° | " | — | — |
| " | " | 45/350° | " | — | — |
| " | " | 60/350° | " | 40% Loss | None |
| 35 | K | 15/350° | " | No Loss | None |
| " | " | 30/350° | " | — | — |
| " | " | 45/350° | " | — | — |
| " | " | 60/350° | " | 10% Loss | None |

[1]Resin solution from Example 1.

TABLE V

PROPERTIES OF DIALKANOLAMINE ADDUCTS OF TRISEPOXY RESINS[1]

| CYMEL 303 wt. % | FORMULA-TION | CURE SCHEDULE min./°F. | MEK DOUBLE RUBS | ELONGA-TION % | BOILING WATER RESISTANCE/ADHESION | Tg (BELOW 250° C.) |
|---|---|---|---|---|---|---|
| 10 | A | 15/350° | Pass | <2 | No Loss | None |
| " | " | 30/350° | " | <2 | — | — |
| " | " | 45/350° | " | 5 | — | — |
| " | " | 60/350° | " | 9% | No Loss | None |
| " | " | 15/450° | " | 32% | No Loss | None |
| " | " | 60/450° | " | 25 | 100% Loss | None |
| 15 | B | 15/350° | " | — | No Loss | None |
| " | " | 30/350° | " | — | — | — |
| " | " | 45/350° | " | — | — | — |
| " | " | 60/350° | " | — | 100% Loss | None |
| 20 | C | 15/350° | " | — | 100% Loss | None |
| " | " | 30/350° | " | — | — | — |
| " | " | 45/350° | " | — | — | — |
| " | " | 60/350° | " | — | 100% Loss | None |
| | Control[2] | 15/350° | " | <2 | 100% Loss | None |

TABLE V-continued

PROPERTIES OF DIALKANOLAMINE ADDUCTS OF TRISEPOXY RESINS[1]

| CYMEL 303 wt. % | FORMULA-TION | CURE SCHEDULE min./°F. | MEK DOUBLE RUBS | ELONGA-TION % | BOILING WATER RESISTANCE/ADHESION | Tg (BELOW 250° C.) |
|---|---|---|---|---|---|---|
| | " | 60/350° | " | 5 | 100% Loss | — |
| | " | 60/450° | " | 4 | 100% Loss | None |

[1]Resin solution from Example 1.
[2]Oxazolidinone modified Polyepoxide A cured with a stoichiometric amount of diaminodiphenylsulfone (DADS).

TABLE VI

PROPERTIES OF DIALKANOLAMINE ADDUCTS OF TRISEPOXY RESINS[1]

| VARCUM 1035 wt. % | FORMULATION | CURE SCHEDULE min./°F. | MEK DOUBLE RUBS | BOILING WATER RESISTANCE/ADHESION | Tg (BELOW 250° C.) |
|---|---|---|---|---|---|
| 20 | D | 15/350° | Pass | No Loss | None |
| " | " | 30/350° | " | — | — |
| " | " | 45/350° | " | — | — |
| " | " | 60/350° | " | 15% Loss | None |
| 25 | E | 15/350° | " | No Loss | None |
| " | " | 30/350° | " | — | — |
| " | " | 45/350° | " | — | — |
| " | " | 60/350° | " | 10% Loss | None |
| 30 | F | 15/350° | " | No Loss | None |
| " | " | 30/350° | " | — | — |
| " | " | 45/350° | " | — | — |
| " | " | 60/350° | " | 100% Loss | None |

[1]Resin solution from Example 1.

TABLE VII

PROPERTIES OF DIALKANOLAMINE ADDUCTS OF TRISEPOXY RESINS[1]

| VARCUM 2380A wt. % | FORMULATION | CURE SCHEDULE min./°F. | MEK DOUBLE RUBS | BOILING WATER RESISTANCE/ADHESION | Tg (BELOW 250° C.) |
|---|---|---|---|---|---|
| 20 | H | 15/350° | Pass | No Loss | None |
| " | " | 30/350° | " | — | — |
| " | " | 45/350° | " | — | — |
| " | " | 60/350° | " | No Loss | None |
| 25 | I | 15/350° | " | No Loss | None |
| " | " | 30/350° | " | — | — |
| " | " | 45/350° | " | — | — |
| " | " | 60/350° | " | No Loss | None |
| 30 | J | 15/350° | " | No Loss | None |
| " | " | 30/350° | " | — | — |
| " | " | 45/350° | " | — | — |
| " | " | 60/350° | " | 5% Loss | None |

[1]Resin solution from Example 1.

TABLE VIII

Torsional Braid Analysis of Cured Formulations[1]

| RUN | FORMULATION | Tg[2] | Tg[3] |
|---|---|---|---|
| 1 | B | 180[4] | — |
| 2 | B | — | 305 |
| 3 | G | 160[5] | — |
| 4 | G | — | 270 |
| 5 | K | 325 | — |
| 6 | K | — | 310 |
| 7 | CONTROL[6] | 325 | — |
| 8 | CONTROL[6] | — | 225 |

[1]Resin solution from Example 1.
[2]Analysis for Tg after curing samples up to 275° C.
[3]Analysis for Tg after heating samples up to 375° C.
[4]Multiple transitions were observed at 180° C. and 305° C.
[5]Multiple transitions were observed at 160° C. and 305° C.
[6]Polyepoxide A cured with a stoichiometric amount of diamino diphenylsulfone (DADS).

EXAMPLE 4

To 8 grams (0.05 epoxy equiv.) of the polyglycidyl ether of tris(hydroxyphenyl)methane, avalilable from The Dow Chemical Company as TACTIX® 742 having an epoxy equivalent weight of 160, heated to 100° C. was added various quantites of diethanolamine as shown in Table IX. The mixture was stirred until homogeneous, then maintained at 100° C. for an additional 30 minutes (1800 s). The temperature was then increased to 150° C. and maintained thereat for an additional 60 minutes (3600 s). The samples were then cooled and analyzed to determine their physical state, water solubility and Mettler softening point (melt flow temperature). Samples A, B, C and D which were examples of the present invention and which employed ratios of moles of diethanolamine per epoxy equivalent of 1.1:1, 1:1, 0.9:1 and 0.85:1 were at least partially soluble in water and had Mettler softening points of 72° C., 78.6° C., 92.4° C. and 107.5° C., respectively, providing evidence that the samples were uncured products. The other samples were not soluble in water and were infusable providing evidence that they were cured products.

TABLE IX

| EXPERIMENT DESIGNATION | DIETHANOLAMINE GRAMS | EQUIV. | RATIO[1] | WATER SOLUBILITY | METTLER SOFTENING POINT[6], °C. |
|---|---|---|---|---|---|
| A | 5.77 | 0.055 | 1.1:1 | Yes[2] | 72 |
| B | 5.25 | 0.05 | 1:1 | Yes[2] | 78.6 |
| C | 4.73 | 0.045 | 0.9:1 | Yes[2] | 92.4 |
| D | 4.46 | 0.0425 | 0.85:1 | Partially[5] | 107.5 |
| E* | 4.20 | 0.04 | 0.80:1 | No[3] | Infusable[4] |
| F* | 3.93 | 0.038 | 0.75:1 | No[3] | Infusable[4] |
| G* | 2.40 | 0.025 | 0.50:1 | No[3] | Infusable[4] |
| H* | 1.31 | 0.013 | 0.25:1 | No[3] | Infusable[4] |
| I* | 0.53 | 0.005 | 0.10:1 | No[3] | Infusable[4] |

*Not an example of the present invention.
[1] Ratio of moles of diethanolamine to epoxy equivalent.
[2] The product was completely soluble in water at room temperature (~25° C.).
[3] The product was insoluble in water at room temperature (~25° C.).
[4] The product did not soften at 250° C. indicating that the product was cured.
[5] The product was only partially soluble in water at room temperature (~25° C.); however it was completely soluble in a 10% aqueous acetic acid solution at room temperature (~25° C.).
[6] The softening point was determined employing a Model FP-5 Mettler Softening Apparatus available from Mettler Instrument Corp., Hightstown, N.J., at a heating rate of 2° C. per minute (0.033 C/S).

We claim:

1. An uncured, water soluble or water miscible adduct prepared by reacting (1) at least one polyglycidyl ether of a tris(hydroxyphenyl)alkane and/or an oxazolidinone modified derivative thereof with (2) at least one dialkanolamine in quantities which provide a ratio of moles of dialkanolamine to equivalents of epoxy groups of from about 0.85:1 to about 1.1:1.

2. An adduct of claim 1 wherein (a) component (1) is a polyglycidyl ether represented by the formula

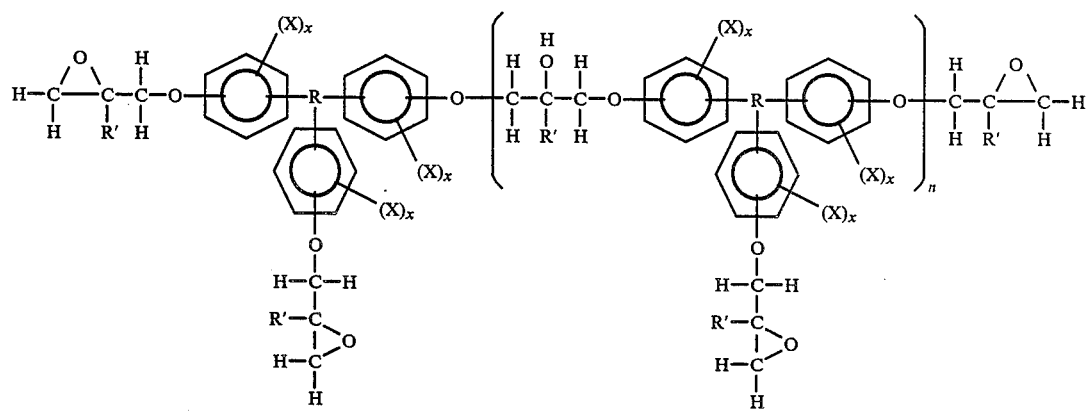

wherein each R is independently a trivalent aliphatic hydrocarbyl group having from 1 to about 5 carbon atoms; each R' is independently hydrogen or a monovalent hydrocarbyl group having from 1 to about 4 carbon atoms; each X is independently hydrogen, an alkyl group having from 1 to about 4 carbon atoms, or a halogen atom; n has an average value of from zero to about 10, and each x independently has a value of 1 or 2 or component (1) is an oxazolidinone derivative thereof and (b) component (2) is represented by the formula HO—R"—NH—R"—OH wherein each R" is independently a divalent hydrocarbyl group having from 1 to about 7 carbon atoms and (c) the ratio of moles of dialkanolamine to equivalents of epoxy groups is from about 0.9:1 to about 1.05:1.

3. An adduct of claim 2 wherein each R is independently a trivalent aliphatic hydrocarbyl group having from about 1 to about 2 carbon atoms; each R' is independently hydrogen or a monovalent hydrocarbyl group having from 1 to about 4 carbon atoms; each X is hydrogen or a halogen atom; n has an average value of from about 0 to about 5; and each R" independently has from about 2 to about 4 carbon atoms.

4. An adduct of claim 3 wherein R contains one carbon atom, each R' is hydrogen and each X is hydrogen.

5. An adduct of claim 4 wherein component (2) is diethanolamine.

6. A curable composition comprising (A) an uncured water soluble or water miscible adduct of (1) at least one polyglycidyl ether of a tris(hydroxyphenyl)alkane and/or an oxazolidinone derivative thereof and (2) at least one dialkanolamine in quantities which provide a ratio of moles of dialkanolamine to epoxy equivalents of from about 0.85:1 to about 1.1:1; and (B) a curing quantity of a suitable curing agent for component (A) selected from amine-aldehyde resins, melamine-aldehyde resins, ureaaldehyde resins, phenol-aldehyde resins or mixture thereof; and (C) optionally a catalytic quantity of a suitable catalyst for the reaction between components (A) and (B).

7. A curable composition of claim 6 wherein (a) component (1) is a polyglycidyl ether represented by the formula

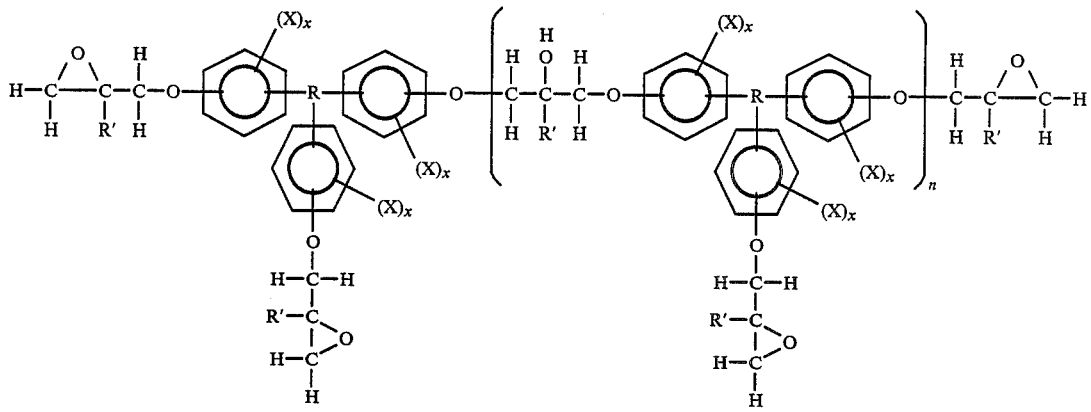

wherein each R is independently a trivalent aliphatic hydrocarbyl group having from 1 to about 5 carbon atoms; each R' is independently hydrogen or a monovalent hydrocarbyl group having from 1 to about 4 carbon atoms; each X is independently hydrogen, an alkyl group having from 1 to about 4 carbon atoms, or a halogen atom; n has an average value of from zero to about 10, and each x independently has a value of 1 or 2 and (b) component (2) is represented by the formula HO—R''—NH—R''—OH wherein each R'' is independently a divalent hydrocarbyl group having from 1 to about 7 carbon atoms and (c) the ratio of moles of dialkanolamine to equivalents of epoxy groups is from about 0.9:1 to about 1.05:1.

8. A curable composition of claim 7 wherein each R is independently a trivalent aliphatic hydrocarbyl group having from about 1 to about 2 carbon atoms; each R' is independently hydrogen or a monovalent hydrocarbyl group having from 1 to about 4 carbon atoms; each X is hydrogen or a halogen atom; n has an average value of from about 0 to about 5; and each R'' independently has from about 2 to about 4 carbon atoms.

9. A curable composition of claim 8 wherein R contains one carbon atom, each R' is hydrogen and each X is hydrogen.

10. A curable composition of claim 9 wherein component (2) is diethanolamine.

11. A coating composition comprising (A) an uncured, water soluble or water miscible adduct of (1) at least one polyglycidyl ether of a tris(hydroxyphenyl)alkane and/or an oxazolidinone derivative thereof and (2) at least one dialkanolamine in quantities which provides a ratio of moles of dialkanolamine to epoxy equivalents of from about 0.85:1 to about 1.1:1: and (B) a curing quantity of a suitable curing agent for component (A) selected from amine-aldehyde resins, melamine-aldehyde resins, urea-aldehyde resins, phenol-aldehyde resins or mixture thereof; and (C) ottionally a catalytic quantity of a suitable catalyst for the reaction between components (A) and (B); (D) water; and (E) optionally an organic solvent; wherein component (D) is present in quantities of from about 25 to about 95 percent by weight of the total composition and component (E) is present in from zero to about 45 percent by weight of total composition.

12. A coating composition of claim 11 wherein (a) component (1) is a polyglycidyl ether represented by the formula

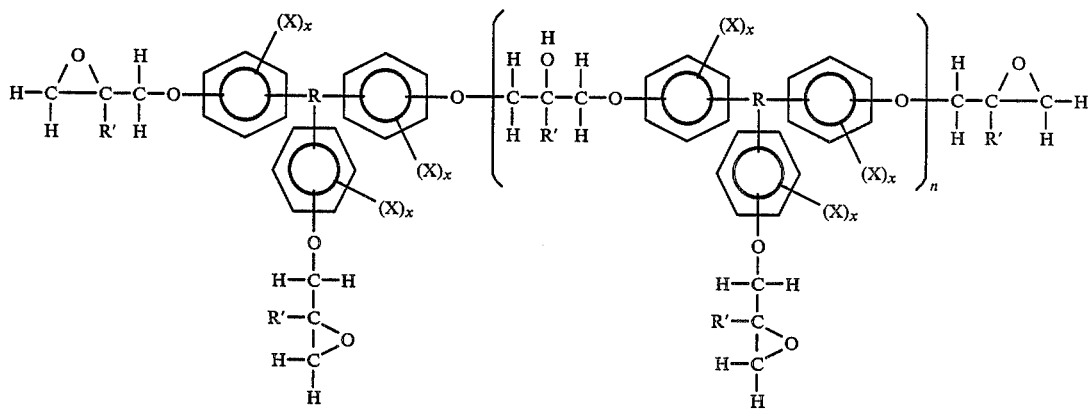

wherein each R is independently a trivalent aliphatic hydrocarbyl group having from 1 to about 5 carbon atoms; each R' is independently hydrogen or a monovalent hydrocarbyl group having from 1 to about 4 carbon atoms; each X is independently hydrogen, an alkyl group having from 1 to about 4 carbon atoms, or a halogen atom; n has an average value of from zero to about 10, and each x independently has a value of 1 or 2 or component (1) is an oxazolidinone derivative thereof and (b) component (2) is represented by the formula HO—R''—NH—R''—OH wherein each R'' is independently a divalent hydrocarbyl group having from 1 to about 7 carbon atoms and (c) the ratio of moles of dialkanolamine to equivalents of epoxy groups is from about 0.9:1 to about 1.05:1; component (D) is present in quantities of from about 25 to about 95 percent by weight of total composition and component (E) is present in quantities of from about zero to about 45 percent by weight of total composition.

13. A coating composition of claim 12 wherein each R is independently a trivalent aliphatic hydrocarbyl group having from about 1 to about 2 carbon atoms; each R' is independently hydrogen or a monovalent hydrocarbyl group having from 1 to about 4 carbon atoms; each X is independently hydrogen or a halogen atom; n has an average value of from about zero to about 5; and each R" independently has from about 2 to about 4 carbon atoms.

14. A coating composition of claim 13 wherein R contains one carbon atom, each R' is hydrogen and each X is hydrogen.

15. A coating composition of claim 14 wherein component (2) is diethanolamine.

16. A coating composition of claim 11 wherein component (A) has been modified with an acid so as to render it more water soluble or water miscible.

17. A coating composition of claim 12 wherein component (A) has been modified with an acid so as to render it more water soluble or water miscible.

18. A coating composition of claim 13 wherein component (A) has been modified with an acid so as to render it more water soluble or water miscible.

19. A coating composition of claim 14 wherein component (A) has been modified with an acid so as to render it more water soluble or water miscible.

20. A coating composition of claim 15 wherein component (A) has been modified with an acid so as to render it more water soluble or water miscible.

* * * * *